Figure 1:
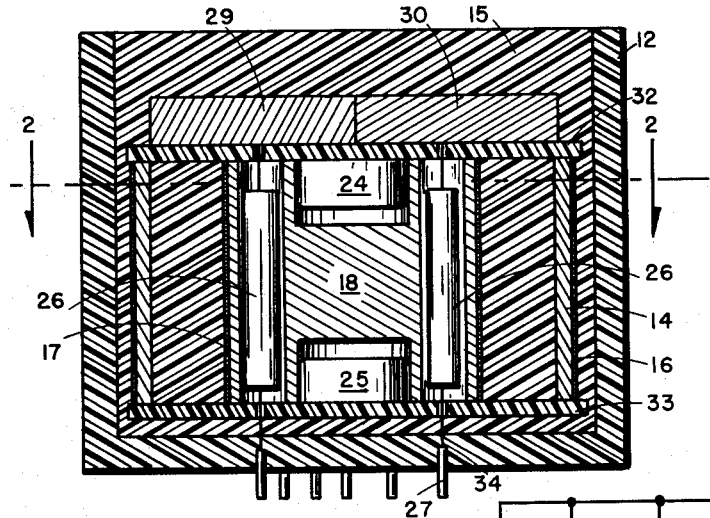

April 3, 1962 G. A. DYER ETAL 3,028,473
TEMPERATURE STABILIZED OVEN
Filed March 12, 1959

INVENTOR.
GEORGE A. DYER
ROY J. PATTERSON
BY
*Edward A. Sokolski*
AGENT

United States Patent Office 3,028,473
Patented Apr. 3, 1962

3,028,473
TEMPERATURE STABILIZED OVEN
George A. Dyer, Anaheim, and Roy J. Patterson, Los Alamitos, Calif., assignors to North American Aviation, Inc.
Filed Mar. 12, 1959, Ser. No. 798,875
9 Claims. (Cl. 219—20)

This invention relates to a temperature stabilized oven and more particularly to such an oven for maintaining the temperature of electrical components within close limits.

Temperature stabilized ovens are used quite widely in regulating the temperatures of electrical components such as crystal diodes, piezoelectric crystals and transistors to assure precision operation of such devices. In many instances, the accuracy of the temperature controlled component is a direct function of the degree of temperature stability which is maintained by the oven. It is therefore desirable to have a temperature stabilized oven which maintains the desired temperature within very close tolerances. At the same time it is important, especially in military applications, that the oven be rugged and have a high degree of reliability over long periods of operation.

Many of the devices now in use utilize a thermostatic switch in controlling electrical heaters to maintain temperature constant. Other devices utilize switches actuated by bellows or similar expansion type devices which are driven by changes of pressure incident to the evaporation of a liquid, the temperature of evaporation being the desired temperature control point. Such devices have several disadvantages. Among these are limited reliability over long periods of operation, limited regulation precision, complexity, and difficulty of adaptation to miniature construction.

The device of this invention overcomes all of these drawbacks and provides a simple, highly reliable, and extremely compact device which is capable of regulating temperature within .01° F. The device of this invention, while simulating a precision switch, has no moving parts such as contact switches to wear out. In addition, it does not resort to changes of state from liquid to gas in order to accomplish its regulation. The device of this invention uses thermistors to sense changes of temperature. These thermistors are arranged in an electronic switching circuit to allow for automatic operation of the switches to turn heater units on and off. The transistors and other critical components are mounted within the temperature controlled portions of the oven itself so that they are not subject to temperature variations and in this manner can operate to a higher degree of accuracy. This greatly improves the precision of the device. In addition, all of the components used in the device of this invention are of such a nature that they are capable of operating reliably over long periods of time without replacement.

It is therefore an object of this invention to provide an improved temperature stabilized oven.

It is a further object of this invention to provide a temperature stabilized oven which has a high degree of reliability.

It is still a further object of this invention to provide a highly precise temperature stabilized oven using transistor switching circuitry.

It is a still further object of this invention to provide a temperature stabilized oven wherein the control circuitry is temperature stabilized within the oven.

It is still a further object of this invention to provide an improved temperature stabilized oven which lends itself to compact construction.

Figure 3:
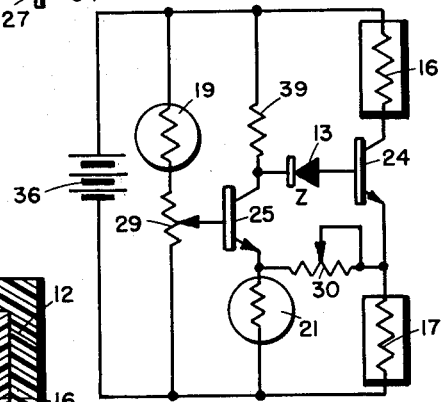
Figure 2:
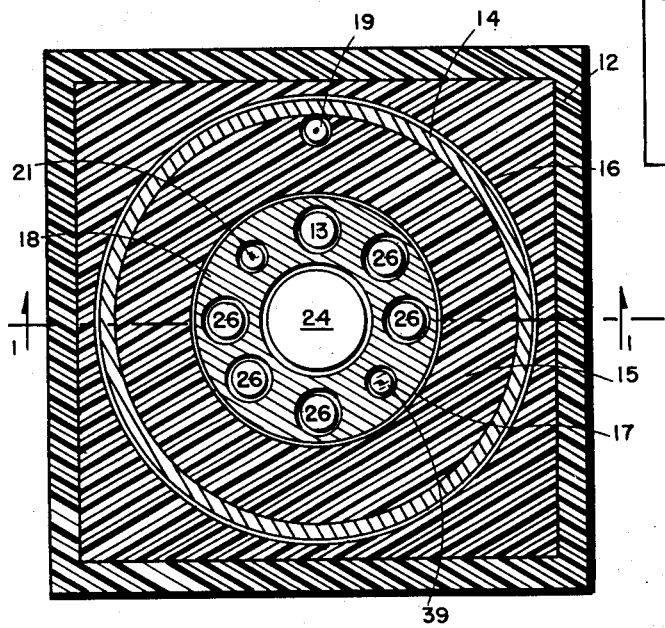

Other objects of this invention will become apparent from the following description taken in connection with the accompanying drawings in which FIG. 1 is an elevation view with cutaway section of a preferred embodiment of the invention;

FIG. 2 is a cross-sectional view of the device of FIG. 1 taken as viewed along the line 2—2 as indicated in FIG. 1;

And FIG. 3 is a schematic diagram of a preferred embodiment of the control circuitry of the device of the invention.

Referring to FIGS. 1 and 2, which illustrate a preferred embodiment of the device of the invention, the complete oven is housed in a case 12 which may be fabricated of any suitable material such as plastic. It is to be noted that these figures are about 2½ times the actual size of certain units actually constructed. The device may have an outer heat sink formed by cylindrical conductive section 14 around which is a heater unit 16 which may be comprised of turns of Nichrome or similar heating wire wound around the cylinder. The heating unit 16 should be appropriately electrically insulated from conductive section 14 by an appropriate insulating covering (not shown) either over the conductive section or over the heating wire. A heater unit 17 similar in construction to heater unit 16 is wound around an inner heat sink formed by inner conductive section 18. Both conductive sections 14 and 18 should be fabricated of a highly heat conductive material such as, for example, brass. While two heat sinks are shown in the preferred embodiment, the outer heat sink may be eliminated and both heater windings wound around the inner sink. However, the use of a single heat sink will lower the precision of temperature regulation.

Thermistor 19 is mounted within potting material 15 located between the heat sinks while a similar thermistor 21 is mounted within a cavity formed within inner conductive section 18. Transistors 24 and 25, zener diode 13, resistor 39, and the components 26 to be temperature controlled are mounted within appropriate cavities formed within the inner heat sink. Potentiometers 29 and 30 may be mounted on top of terminal board 32. Terminal boards 32 and 33 may be provided for making interconnections between the various control circuit components. Contact pins 27 may be utilized for bringing the leads 34 from the various temperature controlled components and for supplying the power to the control circuit within the unit from an appropriate external source (not shown). The entire unit may be encapsulated or potted with a suitable encapsulating material 15 such as synthetic resin foam. As has already been noted, the cylinder 16 forming the outer heat sink may be eliminated at a sacrifice of the accuracy of temperature control but with the advantage of simplification of fabrication.

Referring now to FIG. 3, a schematic diagram of a preferred embodiment of the invention is shown. The positive terminal of direct current source 36 is connected to one end of thermistor 19, the other end of this thermistor being connected to one end of potentiometer 29. The other end of potentiometer 29 is connected to the negative terminal of power source 36. The arm of potentiometer 29 is connected to the base of a first electronic switch, transistor 25. The positive end of power source 36 is connected through resistor 39 to the collector of transistor 25. The positive terminal of power source 36 is also connected through heater unit 16 to the collector of a second electronic switch, transistor 24. The emitter of transistor 25 is connected through thermistor 21 to the negative terminal of power source 36 while the emitter of transistor 24 is connected through heater unit 17 to the negative terminal of source 36. Potentiometer 30 is connected between the emitters of transistors 24 and 25 with its variable arm being connected to the emitter of transistor 24. The anode of zener diode 13 is connected to the base of transistor 24 while the cathode of this zener diode is connected to the collector of transistor 25.

The operation of the circuit is as follows: When the oven is initially placed in operation, the resistances of thermistors 19 and 21 are relatively high, (assuming that the ambient temperature is around normal room temperature). Therefore, transistor 25 will be cut off, the potential between its base and emitter not being sufficiently positive to cause it to conduct. As can be seen, potentiometer 29 can be set to determine the conduction point of transistor 25 and this potentiometer may be initially set to fix the operating temperature of the oven. With transistor 25 cut off, the positive supply voltage will appear at its collector. This will cause zener diode 13 to break down and a positive potential will be applied to the base of transistor 24. The circuit components are chosen so that under these conditions transistor 24 will conduct heavily into saturation. This will cause current to flow through heater windings 16 and 17 thereby heating up the oven. As the temperature of the oven increases, the resistances of thermistors 19 and 21 will decrease until a critical point is reached at which time the voltages on the base, emitter and collector of transistor 25 will be such as to cause this transistor to conduct. Such conduction is enhanced by the positive feedback from transistor 25 provided through potentiometer 30. Transistor 25 will rapidly switch over to saturation conduction while transistor 24 will be cut off. With transistor 25 conducting heavily, its collector voltage will approach the potential of its emitter. This lowered potential as increased by the voltage dropping action of zener diode 13 will appear at the base of transistor 24 to assure its cut off. Zener diode 13 assures adequate cut off bias for transistor 24 and eliminates leakage effects of transistor 25. Cycling between the conduction states of transistors 25 and 24 will occur with minute fluctuations in temperature to achieve highly accurate temperature control.

Potentiometer 29 may be initially set to achieve the desired control temperature as its setting will determine the firing or conduction point for transistor 25. Potentiometer 30 may be initially set for a desired cycling sensitivity, i.e., for the amount of temperature variation which will actuate the control circuit and cause conduction to shift from one transistor to the other.

Thermistor 19 performs the dual function of sensing the temperature of the outer sink and anticipating ambient changes. The use of this thermistor in an outer heat sink enables a higher degree of accuracy in the unit than could be obtained with a single heat sink. In applications where heat control requirements are less stringent, a single heat sink may be utilized. Experimentation has indicated that temperature may be controlled within .01° where the inner and outer heat sink are utilized while such control capabilities have been found to be about .1° with a single heat sink.

It is to be noted that all of the critical components of the control circuit are either mounted within the heat sink or adjacent thereto so that these components themselves are temperature controlled and not being affected by outside ambient temperatures are capable of more precise and predictable performance.

The device of this invention may be adapted for use to control the temperature of any electrical components which can be mounted within such an oven. Components which have been stabilized by the disclosed apparatus are, for example, the semi-conductor diodes of a modulator.

Typical component values for the circuit shown in FIG. 3 might be as follows:

| | |
|---|---|
| Thermistor 19 | Type 51A3, Victory Engineering Company, Union, New Jersey. |
| Thermistor 21 | Type D054, General Electric Corp. |
| Transistor 25 | Type 690T1. |
| Transistor 24 | Type 2N547. |
| Heater Unit 16 | 120 ohms ± 5%. |
| Heater Unit 17 | 30 ohms ± 5%. |
| Potentiometer 29 | 25 kilohms. |
| Potentiometer 30 | 2 kilohms. |
| Zener Diode 13 | Type 911D18. |
| Resistor 39 | 4.22 kilohms ± 1%. |

It can be seen that the device of this invention may be readily adapted, using the basic considerations set forth in this specification, to design suitable embodiments of the device described for use in regulating the temperatures of a variety of electrical components. The device of this invention provides an extremely accurate and reliable yet simple temperature stabilized oven.

While the invention has been described and illustrated in detail, it is to be clearly understood that the same is by way of illustration and example only and is not to be taken by way of limitation, the spirit and scope of this invention being limited only by the terms of the appended claims.

We claim:

1. A temperature controlled oven comprising a case, a heat sink mounted within said case, means for heating said heat sink, and electronic switching circuit means connected in circuit with said heating means for controlling the temperature of said heat sink, said electronic switching circuit means being mounted within said heat sink, said electronic switching circuit means comprising a pair of transistors connected in circuit with each other, thermistor means connected in circuit with one of said transistors, said heating means being connected in circuit with the other of said transistors.

2. The device as recited in claim 1 wherein said electronic switching circuit additionally comprises a zener diode connected between the collector of said one of said transistors and the base of said other of said transistors.

3. In a temperature controlled oven, a case, an inner heat conductive section forming a first heat sink, a first heating coil wound around said inner conductive section, an outer heat conductive section surrounding said inner section and forming a second heat sink, a second heating coil wound around said outer conductive section, first and second interconnected electronic switches, one of said switches being connected in circuit with said heating coils, a first thermistor mounted within said first heat sink, and a second thermistor mounted within said second heat sink, said thermistors being connected in circuit with the other of said electronic switches, said electronic switches being mounted within said first heat sink.

4. The device as recited in claim 3 wherein said electronic switches are transistors.

5. In combination, a case, heating means mounted within said case, a heat sink positioned adjacent said heating means, and a control circuit connected to control said heating means, said control circuit comprising first and second transistors, a pair of thermistors connected in circuit with said first transistor, a zener diode connected between the collector of said first transistor and the base of said second transistor, and a power source connected in circuit with said transistors, said heating means being connected in series circuit with said second transistor and said power source.

6. In combination, a case, heating means mounted within said case, a heat sink mounted adjacent said heating means, and a control circuit connected to control said heating means, said control circuit comprising first and second interconnected transistors, a pair of thermistors connected in circuit with said first transistor, and a power source connected in circuit with said transistors, said heating means being connected in series circuit with said second transistor and said power source, said transistors and said thermistors being mounted within said heat sink.

7. The device as recited in claim 6 wherein the interconnection between said transistors comprises a zener diode connected between the collector of said first transistor and the base of said second transistor, said zener diode being mounted within said heat sink.

8. In a temperature stabilized oven for regulating the temperature of a component, a first heat sink, a first heating coil wound around said first heat sink, a second heat sink within said first heat sink, a second heating coil wound around said second heat sink, a first thermistor mounted adjacent said second heat sink, said first heat sink having at least one cavity therein, first and second transistors, a zener diode connected between the collector of said first transistor and the base of said second transistor, a direct current power source, said first and second heating coils being connected between said power source and the emitter and collector of said second transistor, said first thermistor being connected between the emitter of said first transistor and one terminal of said power source, a first resistor connected between the other terminal of said power source and the collector of said first transistor, a potentiometer, a second thermistor connected between the other terminal of said power source and one end of said potentiometer, the other end of said potentiometer being connected to said one terminal of said power source, the arm of said potentiometer being connected to the base of said first transistor, and a second resistor connected between the emitter of said first transistor and the emitter of said second transistor, said component to be temperature regulated being mounted within said first heat sink cavity.

9. The device as recited in claim 8 wherein said first heat sink has a plurality of cavities therein and said transistors, said zener diode, said second thermistor, and said resistors are mounted within said cavities.

References Cited in the file of this patent

UNITED STATES PATENTS

| | | |
|---|---|---|
| 2,747,069 | Miller | May 22, 1956 |
| 2,859,402 | Schaeve | Nov. 4, 1958 |
| 2,871,376 | Kretzmer | Jan. 27, 1959 |
| 2,872,556 | Obermaier | Feb. 3, 1959 |
| 2,897,432 | Jackson | July 28, 1959 |
| 2,932,714 | Merrill | Apr. 12, 1960 |
| 2,956,179 | Yragui | Oct. 11, 1960 |
| 2,967,924 | Friend | Jan. 10, 1961 |